United States Patent [19]

Erickson

[11] 4,435,946

[45] Mar. 13, 1984

[54] MULTI-ROW CROP HARVESTING ATTACHMENT

[76] Inventor: Leland E. Erickson, Forman, N. Dak. 58032

[21] Appl. No.: 455,218

[22] Filed: Jan. 3, 1983

Related U.S. Application Data

[62] Division of Ser. No. 311,459, Oct. 14, 1981.

[51] Int. Cl.³ .................... A01D 41/06; A01D 41/12; A01D 47/00
[52] U.S. Cl. ........................................ 56/15.6; 56/208
[58] Field of Search .................... 56/15.6, 208, 210, 2

[56] References Cited

U.S. PATENT DOCUMENTS

| | | | |
|---|---|---|---|
| 3,026,664 | 3/1962 | Beach et al. | 56/15.6 |
| 3,035,384 | 5/1962 | Mitchell | 56/15.1 |
| 3,324,637 | 6/1967 | Ashton et al. | 56/15.6 |
| 3,574,990 | 2/1972 | Calder | 56/208 |
| 3,638,407 | 2/1972 | Togami | 56/15.6 |
| 3,665,688 | 5/1972 | Sheehan et al. | 56/15.6 |
| 3,785,130 | 1/1974 | Gaeddert | 56/98 |
| 4,067,176 | 1/1978 | Hoch et al. | 56/15.6 |
| 4,137,696 | 2/1979 | Webb | 56/208 |
| 4,206,584 | 6/1980 | Johnson et al. | 56/210 |
| 4,253,295 | 3/1981 | Knepper | 56/15.6 |
| 4,255,920 | 3/1981 | Jansen | 56/126 |
| 4,313,294 | 2/1982 | Martenas | 56/208 |

FOREIGN PATENT DOCUMENTS

2308299 11/1976 France .................................. 56/208

*Primary Examiner*—Paul J. Hirsch

*Attorney, Agent, or Firm*—Dorsey & Whitney

[57] ABSTRACT

A multi-row crop harvesting attachment for use in combination with a combine consisting of two or more drive sections having a guide edge on each of its two sides, platform sections positioned between each pair of drive sections, each platform section having a guide edge on each of its two sides, each platform section's guide edge in transverse opposition to the adjacent drive section guide edge, and two divider sections positioned outside of each of the outer most drive sections, each divider section having a single guide edge, each divider section's guide edge in transverse opposition to the adjacent drive section guide edge. A longitudinally rearward and narrow flightway for crop stalks is formed by the opposed guide edges. The drive sections further consist of two augers, each positioned over a flightway adjacent to the drive section for guiding crop stalks longitudinally rearward along the flightways. The harvesting attachment further consists of a locking cam, for mounting the harvesting attachment to a combine, which distributes the harvesting attachment's weight upon the front upper side of a combine's cross auger trough and which is connected to the upper frame of the cross auger trough. A mounting bracket is pivotally connected to the locking cam at a point tending to rotate the cam about its weight distribution point and away from the upper frame of the cross auger trough. The mounting bracket is shaped so that the center of gravity of the remaining portions of the harvesting attachment force the frame to rotate under and contact the under side of a combine's cross auger trough.

7 Claims, 17 Drawing Figures

MULTI-ROW CROP HARVESTING ATTACHMENT

This is a division of application Ser. No. 311,459, filed Oct. 14, 1981.

This invention relates generally to improvements in a multi-row crop harvesting attachment for use in combination with a conventional combine, and more particularly to improvements that guide stalk crops rearward toward the combine and to improvements that allow convenient mounting of the harvesting attachment to a combine.

Stalk crops are often considered valuable for their seeds and not for their stalks. It is desirable that such crops be harvested in a way that the seed bearing portion of the crop is separated from the stalks. Many stalk crops, such as corn, milo, and sunflowers carry the seeds at or near the top of the stalk. For such crops, it is desirable that the stalk be severed by the combine as near to the top of the stalk as practicable.

Sunflowers, for example, are considered valuable for the seeds they produce. In harvesting sunflowers, it is desirable to separate the sunflower heads bearing the seeds from the stalks. Sunflowers, however, are known to be difficult to harvest in this manner. Under some conditions, the stalks are rigid, supporting the heavy sunflower heads. Under other conditions, the stalks are damaged or flaccid, with the result that the stalks and heads lie near to or on the ground, or the heads easily break off of the stalks during harvesting.

It is known to guide stalk crops rearward toward a combine by utilizing stalk entrainment devices such as a pair of rearwardly conveying augers or rearwardly advancing protruding fingers. Such stalk entrainment devices, however, have been found to be unsuitable for harvesting sunflowers.

It is an object of the present invention to provide an improved harvesting attachment particularly suited for harvesting sunflowers, but which will also harvest corn, milo and other stalk crops. It is a more specific object of the invention to provide an improved flightway through which stalks are guided rearward and to provide for capturing and conveying rearward sunflower heads which break off any seeds which break loose in the course of harvesting sunflowers. It is a further object to provide a harvesting attachment suitable for harvesting sunflowers which is of simple and inexpensive construction and yet functions more effectively than earlier devices for similar purposes. It is a still further object to provide a harvesting attachment with modular construction which allows easy adjustment for the size of the combine and the number of rows of stalk crop desired to be harvested by one sweep of the field. Finally, it is an object of the present invention to provide harvesting attachments of the above general type that mount onto a combine conveniently.

The harvesting attachment of the present invention consists of drive sections, platform sections, and divider sections mounted on the harvesting attachment's frame and aligned transversely to the longitudinal direction of movement of the frame.

Each drive section consists of two guide edges, each located at one of the guide section's sides, i.e., at one of the outer transverse boundaries of the drive section. Each guide edge has a smooth outer surface parallel to the longitudinal direction of movement of the harvesting attachment and allows rearward longitudinal movement of row crop stalks thereagainst. An auger trough is located immediately transversely inward of each guide edge. An auger, rotated by a hydraulic motor located within the drive section, is itself located over each auger trough, the auger flighting extending transversely outward beyond the nearby guide edge by a distance greater than the thickness of the row crop stalk to be harvested.

A platform section is mounted between pairs of such drive sections. Each platform section has two guide edges, each located at one of its sides, i.e., at one of its outer transverse boundaries. Each guide edge also presents a smooth outer surface that is parallel to the longitudinal direction of movement of the harvesting attachment. When mounted, each guide edge of the platform section is immediately opposed to the transversely outer boundary of the auger flighting of the adjacent drive section. Thus, narrow flightways for rearwardly moving row crop stalks are formed between the respective opposing guide edges of the drive sections and platform sections. Because of the unique spacing of the respective opposing guide edges, the flightways have a width approximating the thickness of the row crop stalks.

The outermost two drive sections are flanked by divider sections. Each divider section has a guide edge similar to a platform section's guide edges in that the divider section's guide edge is immediately opposed to the transversely outer boundary of the auger flighting of the adjacent drive section auger. Thus, a flightway similar to those between platform sections and drive sections are formed between divider sections and drive sections.

As an alternative to the present invention, a harvesting attachment may consist of a single drive section flanked transversely on each side by a divider section. In this case, a flightway identical to those discussed above is formed by immediately opposing the transversely interboundary of a drive section's auger flightings by a divider section's guide edge. This alternative embodiment would be useful for harvesting two rows of stalk crops at a time.

The harvesting attachment of the present invention also utilizes the following structure for convenient mounting to a conventional combine.

The harvesting attachment further consists of a mounting bracket which is rigidly connected to the harvesting attachment's frame. The mounting bracket in turn is pivotally connected to a locking cam at a point A on the mounting bracket such that if the locking cam were to be suspended the force of gravity would cause the divider, drive, and platform sections to rotate downward toward the ground and at some point in the rotation the sections form an acute angle relative to the ground in excess of the acute angle normally present when the harvesting attachment is mounted on a conventional combine. The mounting bracket is pivotally connected to the locking cam at a point B on the cam such that if the cam were pivotally supported at a point C on the cam by the front portion of a combine's cross auger trough and the cam were connected at a point D on the cam to the upper frame portion of the combine's cross auger trough, the points A–B would lie longitudinally forward of a line containing points C and D.

A portion of the frame extends under the combine's cross auger trough so that as the force of gravity causes the longitudinally forward portion of the harvesting attachment to rotate toward the ground the portion of the frame extending under the combine's cross auger trough contacts the trough and prevents further rotation. By simple adjustments of the foregoing relationships, the weight of the harvesting attachment is borne by the combine's cross auger trough through the pivot point C on the locking cam, while the angle of the drive, platform, and divider sections relative to the ground may be set as desired.

Horizontal movement of the harvesting attachment toward the combine's cross auger trough is prevented by the use of sickle guard guides which oppose the combine sickle guards when the harvesting attachment is mounted onto the combine in the above described manner. Horizontal sheer movement of the harvesting attachment relative to the combine's cross auger trough is prevented by use of sheer spacers protruding from the sickle guard guide. Each sheer spacer wedges between a pair of sickle guards being opposed by the sickle guard guide.

The above and other objects, features and advantages of the present invention will become more readily apparent from the following description, reference being made to the accompanying drawings in which:

FIG. 5 is rear view of a drive section and portions of adjacent platform sections taken through lines 5—5 of FIG. 3;

Figure 1:
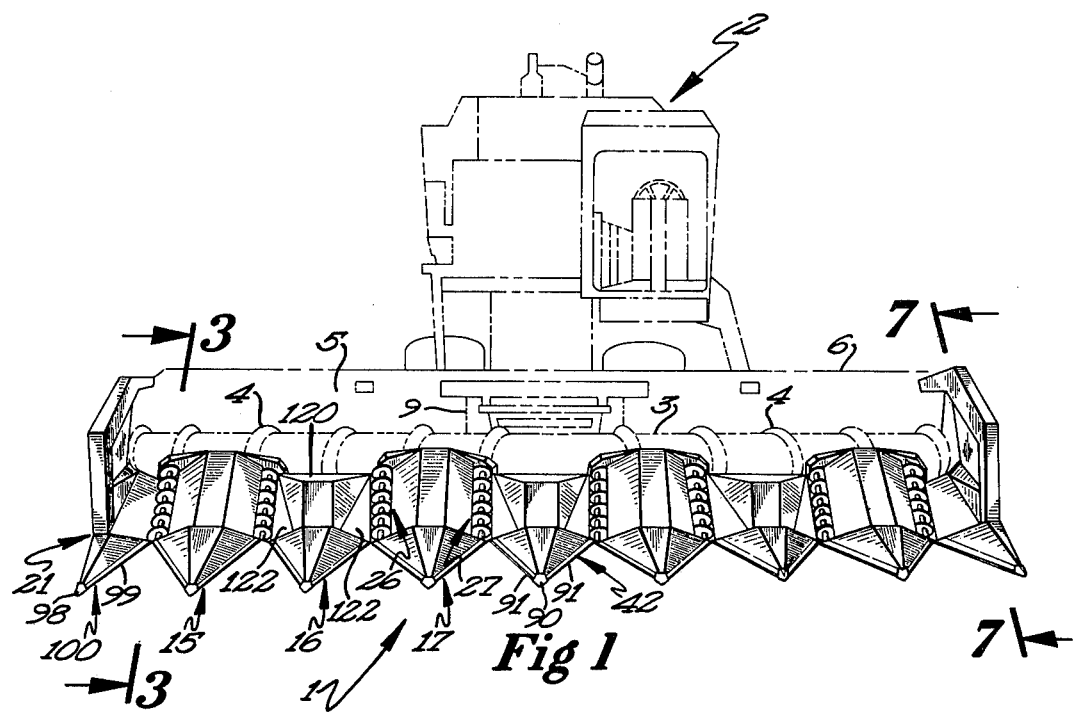
FIG. 1 is a front view of the harvesting attachment mounted onto a conventional combine.
Figure 10:
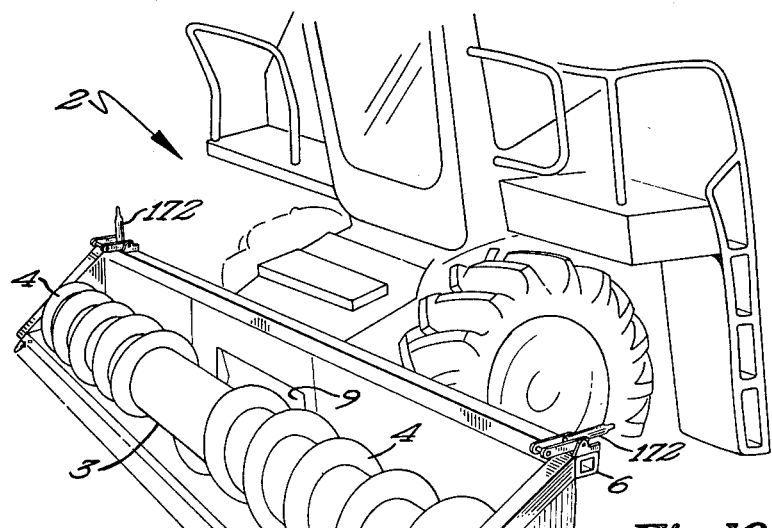
FIG. 10 shows a combine cross auger trough.

The preferred embodiment of the harvesting attachment 1 is shown mounted to a conventional combine 2 in FIG. 1. With reference to both FIGS. 1, 2, and 10, combine 2 consists of grain cutting platform termed herein a cross auger trough 5 in which is located cross auger 3. Crop material falling into cross auger trough 5 is conveyed by auger flighting 4 towards area 9 wherein such crop material is conveyed rearward towards a storage facility located on or pulled by the combine. The frontmost portion of auger trough 5 contains thereon sickle bars 10 for severing the upper portion of stalk crop. Protruding further forward than sickle bar 10 are sickle guards, exemplified in FIG. 10 by guards 11, 12 and 13.

Figure 2:
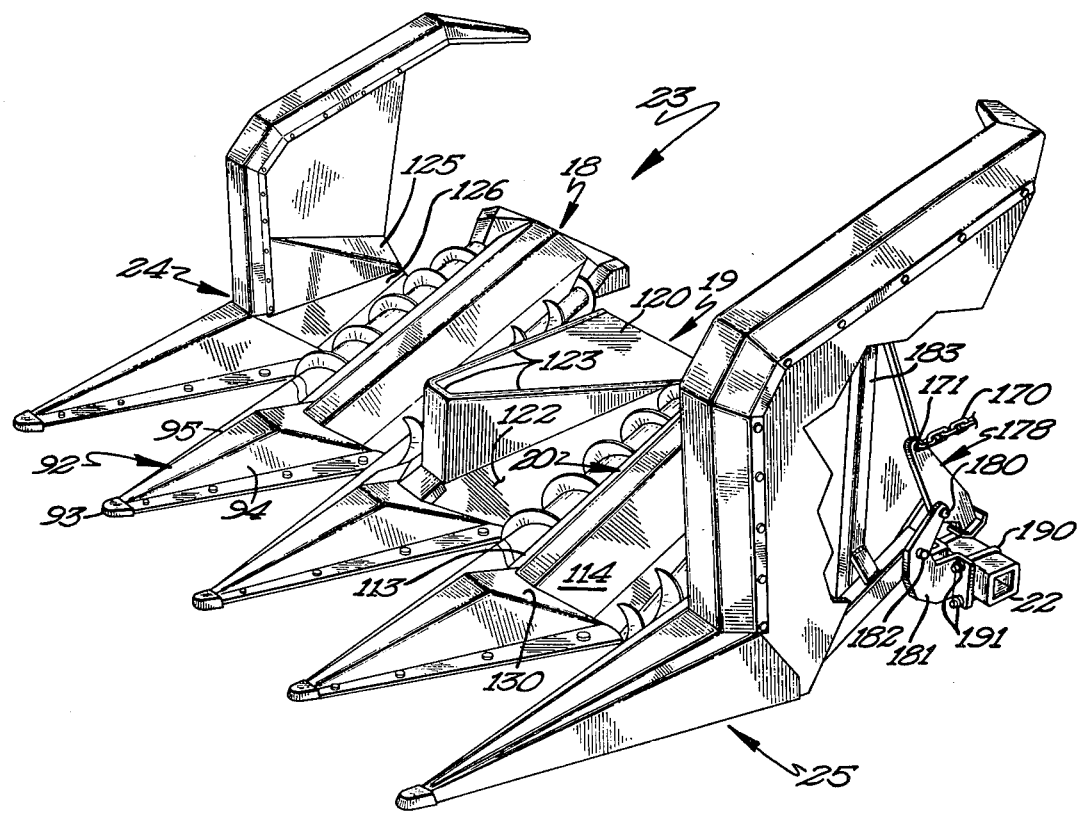
FIG. 2 is an elevated side view of the harvesting attachment, partly broken away in order to show structure utilized in mounting the harvesting attachment to a combine.

With reference to FIGS. 1 and 2, harvesting attachment 1 is constructed so as to harvest eight rows of stalk crop at a time, while harvesting attachment 23 is constructed to harvest four rows of stalk crop at a time. Harvesting attachment 1, when harvesting eight rows of crop at a time, traverses a field in a longitudinal direction of movement. Harvesting attachments 1 and 2 are basically constructed by mounting on main frame 22 two or more drive sections. Between each pair of drive sections, a platform section is mounted. This is illustrated in FIG. 1 where platform section 16 is mounted between drive sections 15 and 17, platform section 16 being aligned transversely with drive sections 15 and 17. Similarly, in FIG. 2 platform section 19 is mounted between and aligned transversely with drive sections 18 and 20. In FIG. 1, divider section 21 is mounted on main frame 220 adjacent to and aligned transversely with drive section 15. In FIG. 2, divider section 24 is similarly mounted on main frame 22 adjacent to and aligned transversely with drive section 18.

Figure 8:
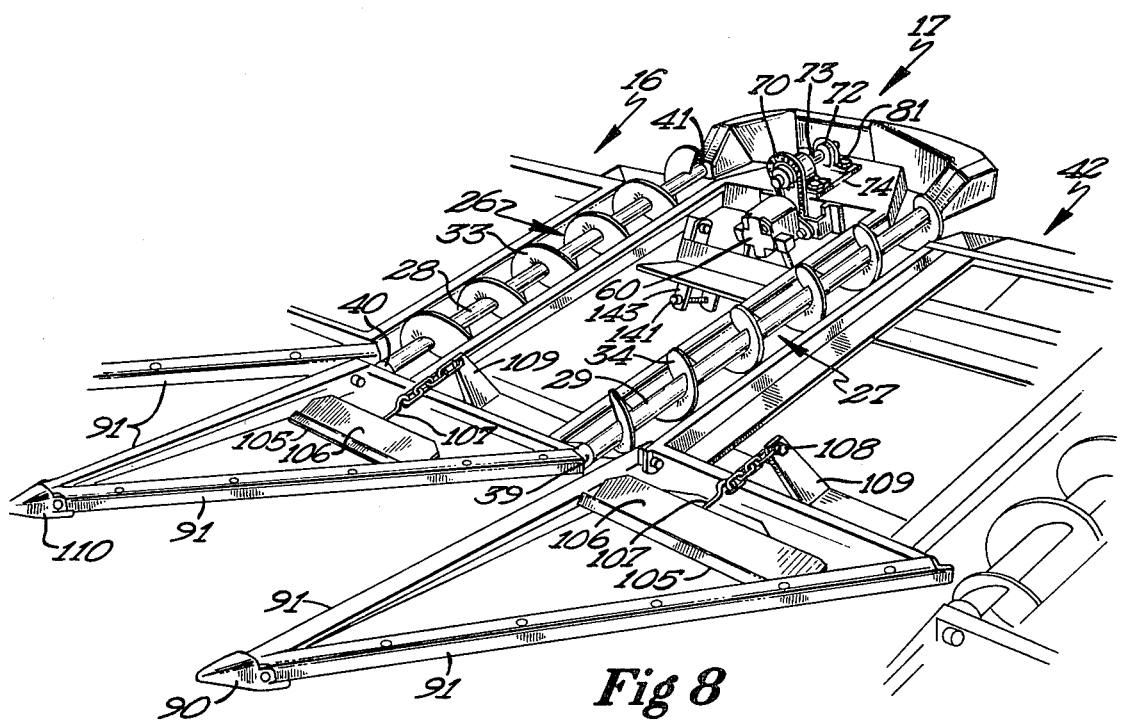
FIG. 8 is a partially elevated view of the internal structure of a drive section and adjacent platform sections.
Figure 9:
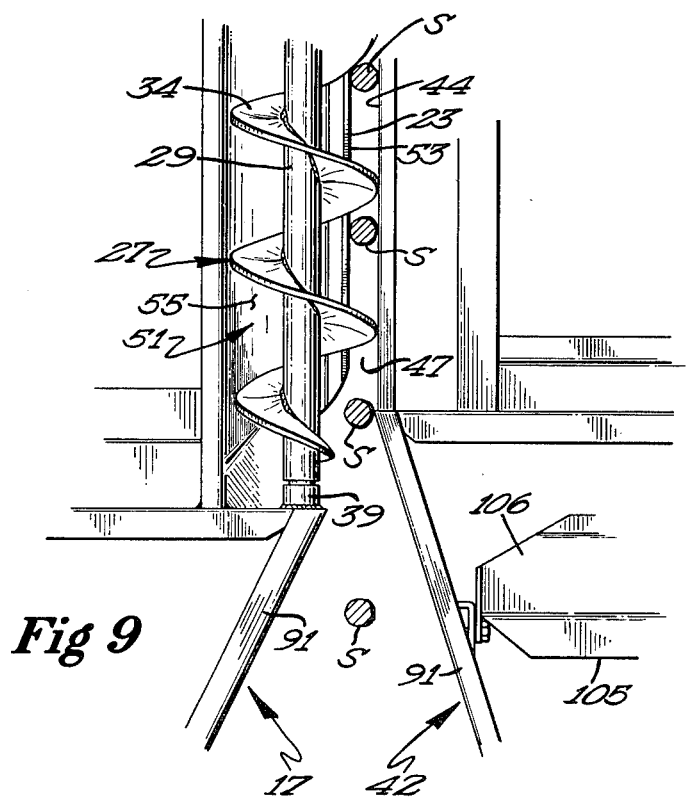
FIG. 9 is a top view showing crop stalks being conveyed through a flightway.
Figure 14:
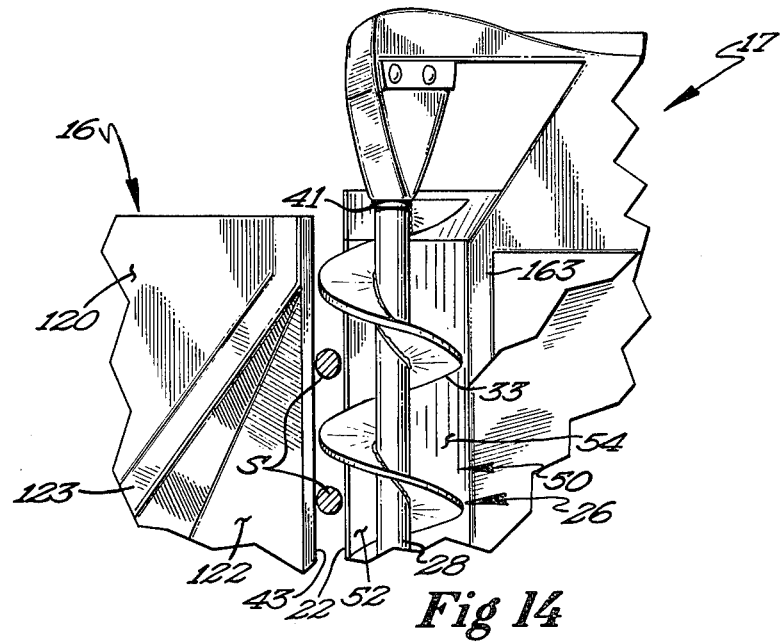
FIG. 14 is a top view of the rearward portion of a flightway.

Drive sections may be further described as follows. In FIGS. 5, 8 and 9, drive section 17 has guide edges 22 and 23 located at each of the outer transverse boundaries of drive section 17. Guide edges 22 and 23 present a smooth outer surface parallel to the longitudinal direction of movement of the frame and allow rearward longitudinal movement of row crop stalks thereagainst. This is illustrated by reference to FIGS. 9 and 14 wherein portions of guide edges 22 and 23 are shown respectively. Also shown are crop stalks S moving longitudinally rearward.

Figure 3:
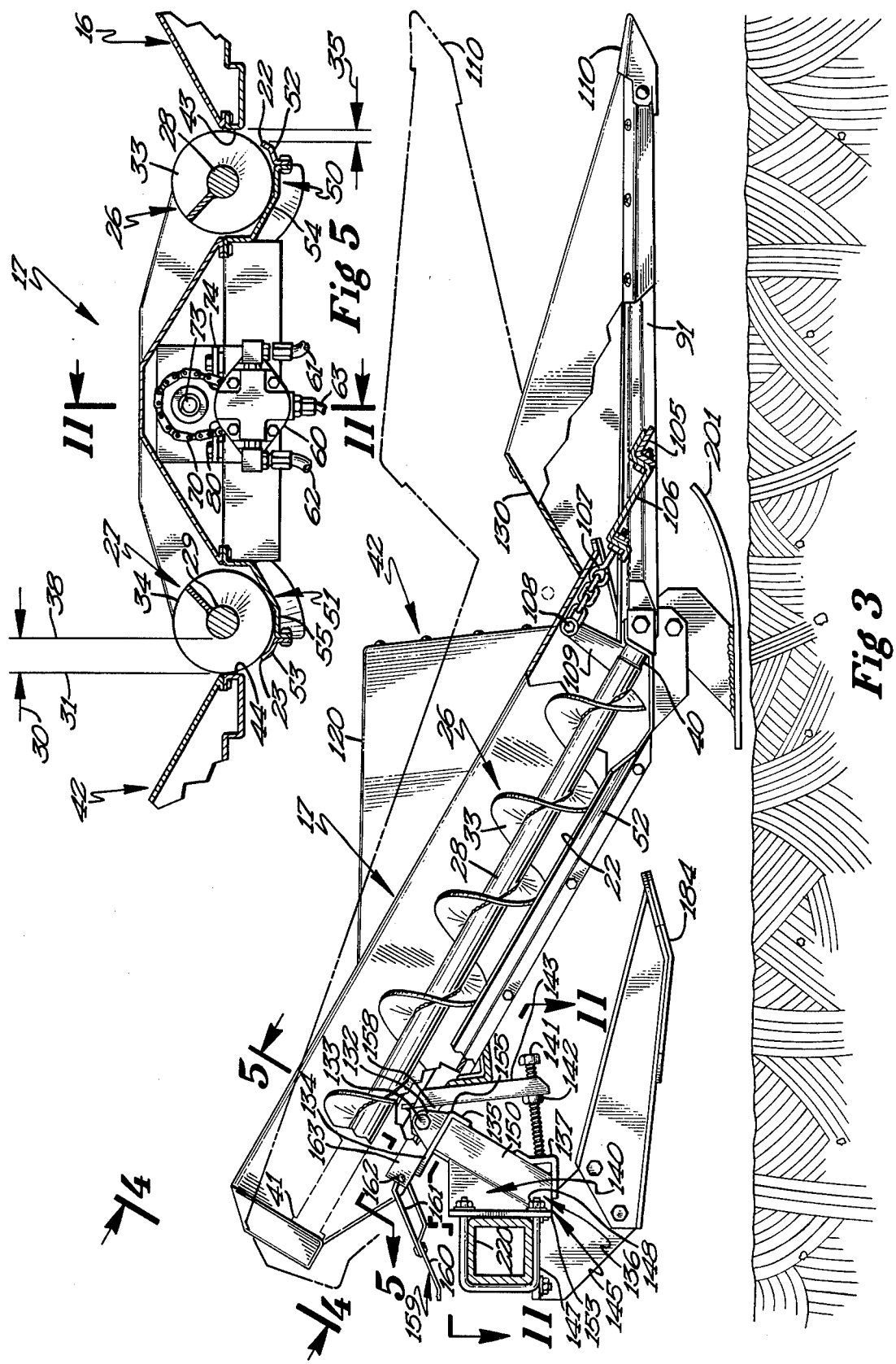
FIG. 3 is a side view of the harvesting attachment taken through lines 3—3 of FIG. 1.

Drive section 17 further has augers 26 and 27, said augers consisting respectively of shafts 28 and 29 and flightings 33 and 34. Augers 26 and 27 are respectively located near and associated with guide edges 22 and 23. Auger 27 has a flighting reach, defined by 30, at least as great as the thickness of row crop stalks. Of course, auger 26 is similarly constructed. The outer boundary of the flighting of auger 27 is defined by line 31. The outer boundary of the flighting of augers 26 and 27 extend respectively transversely outward beyond associated guide edges 22 and 23 by a distance greater than the thickness of row crop stalks. This distance is represented by 35. The transverse outer boundaries of shafts 28 and 29 of augers 26 and 27 do not extend further outward transversely than guide edges 22 and 23 with which they are respectively associated. The outer transverse boundary of shaft 29 is represented by line 38. Augers 26 and 27 are journaled at both ends. FIG. 8 shows journals 39 and 40 which are coupled respectively with augers 27 and 26. Journals at the other end of augers such as augers 26 and 27 are shown in FIG. 3 as 41.

Platform sections in general may be illustrated by reference to platform sections 16 and 42, which are adjacent to drive section 17. Platform section 16 has guide edge 43 while platform section 42 has guide edge 44. Guide edges 43 and 44 are located respectively at an outer transverse boundary of platform sections 16 and 42. Of course, each platform section has at each of its outer transverse boundaries a guide edge similar to one or the other of guide edges 43 and 44 depending upon the orientation of the outer transverse boundary. Guide edges 43 and 44 respectively present a smooth outer surface being parallel to the longitudinal direction of movement of the harvesting attachment and allow longitudinally rearward movement of row crop stalk thereagainst. Platform section guides 43 and 44 are in substantial opposition respectively to guide edges 22 and 23 of drive section 17. Guide edge 43 is spaced transversely substantially the thickness of row crop stalks from guide edge 22 of opposing drive section 17, as indicated by 35. As shown in FIG. 9, a narrow flightway 47 having a width approximately the thickness of crop stalks, for rearwardly conveying row crop stalks S, is created by the substantial opposition of guide edges 23 and 44.

It should be appreciated that the foregoing discussion of the structure of drive section 17 and the platform sections 16 and 42 is not limited to these particular sections. Each drive section is symmetrical with respect to its outer transverse sides, and the same is the case for platform sections.

Divider section 21 relates to drive section 15 as to those items of structure shown in FIG. 5 relating platform section 16 to drive section 17. Drive section 15 has a guide edge (not shown) not in opposition to any platform section's guide edge, because platform sections are mounted between pairs of drive sections only. Divider section 21 has a single guide edge (not shown) located at its outer transverse boundary which is adjacent to the guide edge of draft section 15. The single guide edge of divider section 21 presents a smooth outer surface being parallel to the longitudinal direction of movement of the harvesting attachment and allows longitudinally rearward movement of row crop stalks thereagainst. The guide edge of divider section 21 is in substantial opposition to the guide edge of drive section 15, the guide edge of divider section 21 being spaced transversely approximately the thickness of row crop stalks from the guide edge of drive section 15. Thus, a flightway similar to flightway 47 is thereby formed for rearwardly moving row crop stalks. Of course, it can be appreciated that divider sections in general will be similar to particular divider section 21.

Thus, by use of drive, platform, and divider sections as set forth above, a flightway is created for each row of stalk crops, the flightway having a width of approximately the thickness of the stalks. In the more general embodiment of the invention this flightway has a width that is less than the flighting reach of an auger, and the flightway is transversely located within the flighting reach. In FIG. 9, the preferred embodiment is shown wherein flightway 47 is defined by guide edge 44 being transversely in alignment with the outward reach of auger 26. It can be appreciated that as alternative embodiments flightway 47 could be shifted to the left in FIG. 9 whereby guide edges 23 and 44 would equally be displaced somewhat to the left, the auger remaining in its present position, so long as guide edge 23 did not move so far transversely inward so as to pass beyond the shaft of auger 26.

As a further feature of the preferred embodiment, the guide edge of each platform section and divider section is immediately opposed to the transverse outer boundary of the auger flighting of the adjacent drive section auger nearest the particular guide edge. This is illustrated by FIG. 5 wherein guide edge 43 of platform section 16 is immediately opposed to the transversely outer boundary of auger flighting 33. As a still further feature of the preferred embodiment, auger troughs 50 and 51 are located respectively immediately beneath augers 26 and 27. These auger troughs support crop material falling through the drive section's augers and by so supporting the material allow the augers to convey the crop material rearward by rotation of the augers. As shown in FIG. 5, stripper bars 52 and 53 are attached to trough bases 54 and 55 respectively to form completed auger troughs 50 and 51. In this preferred embodiment, guide edges 22 and 23 are the outer transverse boundaries of stripper bars 52 and 53 respectively. By selecting appropriately sized stripper bars, the width of the flightway can be adjusted so as to suitably conform to the thickness of the row crop stalks to be harvested.

Figure 6:
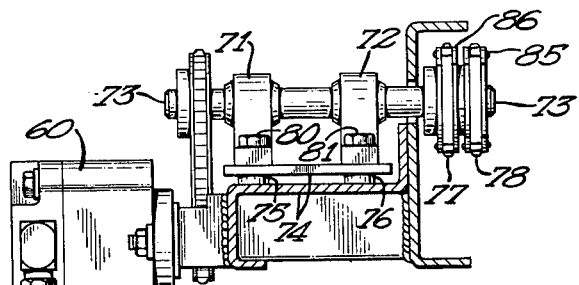
FIG. 6 is a side view of the hydraulic motor which drives the drive section's augers taken through lines 6—6 of FIG. 5.

The drive section's augers are driven by a hydraulic motor located in the drive section itself. Hydraulic motor 60 shown in FIGS. 5 and 6 is illustrative of the hydraulic motors located in each drive section. In the preferred embodiment, hydraulic motor 60 consists of a Borg Warner model M155 available out of Wooster, Ohio. Hydraulic motor 60 will rotate the augers at such a velocity that the auger flighting will progress at the rate equal to a ground speed of the harvesting attachment of eight miles per hour when attached to a combine variable speed reel drive capable of ten to fifteen gallons per minute at 2,000 psi. FIG. 5 shows inlet line 61 and outlet line 62. Although not shown, it can be appreciated that the hydraulic motors of the various drive sections can be connected in series whereby the outlet line of one hydraulic motor leads to the inlet line of the next hydraulic motor in the series, the first such motor in the series receiving hydraulic fluid under pressure from the combine, the last such motor having an outlet line connected to the combine. Other combinations are easily imagined.

Figure 4:
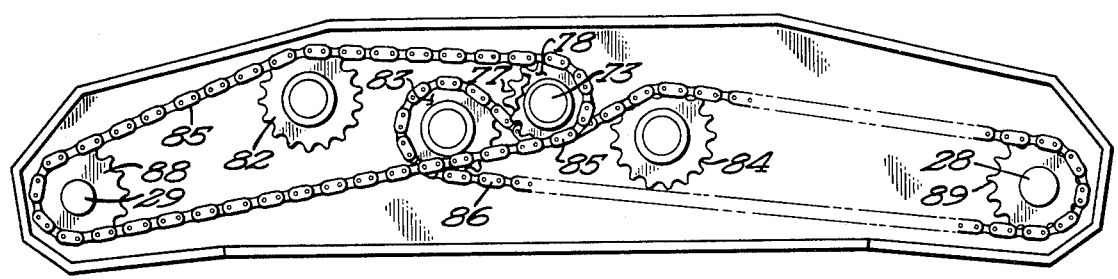
FIG. 4 is a rear view of a drive section taken through lines 4—4 of FIG. 3.

FIGS. 4 and 6 show the hydraulic motor and its linkage to the sprockets attached to the end of the auger shaft. Hydraulic motor 60 is linked to drive shaft 73 by motor drive chain 70. Drive shaft 73 is journaled by pillow blocks 71 and 72. Pillow blocks 71 and 72 are secured to cross member 74 by bolts 80 and 81 and respectively nuts 75 and 76. In FIGS. 4 and 6, drive sprocket 78 is connected to auger sprocket 88 by chain 85, while drive sprocket 87 (not shown in FIG. 4) is connected to auger sprocket 89 by chain 86. Adjustable tension idling sprockets 90, 91 and 92 allow adjusting the tension on chains 85 and 86.

Harvesting attachments 1 and 23 have a forwardly converging gathering member located forward of the drive section's guide edges and forward of the platform section's guide edges. The gathering member has a forward gathering point for riding between two crop rows and two opposed diverging fenders each extending rearward from the forward gathering point to one of the guide edges on that particular section for guiding crops toward the flightways associated with such guide edge. Such gathering members are illustrated by FIGS. 1, 2, 3, and 8.

FIG. 8 shows frame 91 with forward gathering point 90. FIG. 2 shows gathering member 92 having forward gathering point 93 and opposed diverging fenders 94 and 95, each extending rearward from the gathering point to the guide edges of drive section 18.

Each divider section has a forwardly converging gathering member located forward of the divider section's guide edge. The gathering member consists of a forward gathering point for riding between crop rows and a single diverging fender extending rearward from the forward gathering point to the divider section's guide edge for guiding crops toward the flightway associated with that guide edge. Such a forwardly converging gathering member is illustrated by divider section 21 in FIG. 1, and divider sections 24, 25, in FIG. 2. Forwardly converging gathering member 100 is located forward of the guide edge (not shown) of divider section 21. Gathering member 100 has a forward gathering point 98 and diverging fender 99 extending rearward from the gathering point to the guide edge of divider section 21.

The forward gathering members are attached to the respective drive platform and divider sections as shown in FIGS. 3 and 8. Cross member mounting 105 is securely attached to frame 91. Cross member 106 is attached to support mount 109 by length adjustable eyebolt 107, said eyebolt 107 attached to support mount 109 by bolt 108. By adjusting the length of eyebolt 107, the height above the ground at which forward gathering point 110 rides can be adjusted. In the case where sunflowers are lying on the ground the eyebolt would be adjusted so as to have forward gathering point 110 right on the ground. In this mode the sunflowers would be guided towards the flightway. Once caught by the auger in the flightway the sunflower head would ride above the auger thereby slowly stretching out the stalk until it is cut at the appropriate height by the combine. The forward gathering point can be adjusted to run approximately 10 to 12 inches off the ground in the situation where mostly healthy and standing stalks are to be harvested.

The drive sections further have transversely inclined platforms for conveying transversely outward to either of the drive section's augers crop material falling upon these platforms. The platforms are located transversely between each of the drive section's guide edges. This is illustrated by FIGS. 1 and 2 which show, for example, transversely inclined platforms 113 and 114 of drive section 20. Transversely inclined platform section 113 and 114, by the natural vibration of the operating harvesting attachment, convey transversely outward to the drive section's augers crop material falling upon these platforms.

The platform sections have rearwardly inclined platforms for conveying rearward crop material falling on these platforms. These platforms are located transversely between each of the platform section's guide edges. The platform sections further have transversely inclined platforms for conveying transversely outward to either of the platform section's guide edges crop material falling upon these latter platforms. These latter platforms are located adjacent to the platform section's guide edges.

The foregoing is illustrated in FIGS. 1 and 2. Platform sections 19 and 16 have rearwardly inclined platforms 120 which by the natural vibration of the operating harvesting attachment convey rearward crop material falling on platforms 120. Platform sections 19 and 16 also have transversely inclined platforms 122 which by the natural vibration of the operating harvesting attachment convey crop material transversely outward to the respectively adjacent guide edges. Platform 120 has lip 123 on all of its boundaries except the rearward most boundary. Lip 123 rises slightly above the planar platform and thereby prevents crop material which falls on platform 120 from falling off platform 120 in any but a rearward direction.

Each divider section has a rearwardly inclined platform for conveying rearward crop material falling on the platform, the platform located transversely inward to the divider section's single guide edge. The divider section further has a transversely inclined platform for conveying transversely outward to the divider section's guide edge crop material falling upon the platform, the platform being located adjacent to the divider section's guide edge. These platforms are illustrated by divider section 24, wherein rearwardly inclined platform 125 by the natural vibration of the operation of the harvesting attachment conveys rearward crop material falling on platform 125. Platform 125 is located transversely inward to the divider section's single guide edge. Transversely inclined platform 125 by the natural vibration conveys transversely outward to the divider section's guide edge crop material falling thereon, platform 24 located adjacent to the divider section's guide edge.

The forwardly converging gathering members located forward of each platform section and divider section also has a rearwardly inclined platform for conveying crop material rearward and transversely outward to the adjacent auger. This is illustrated by platform 130 which in conjunction with the design of platforms 113 and 114 of drive section 20 conveys crop material falling on platform 130 both rearward and transversely outward to the adjacent augers.

Figure 11:
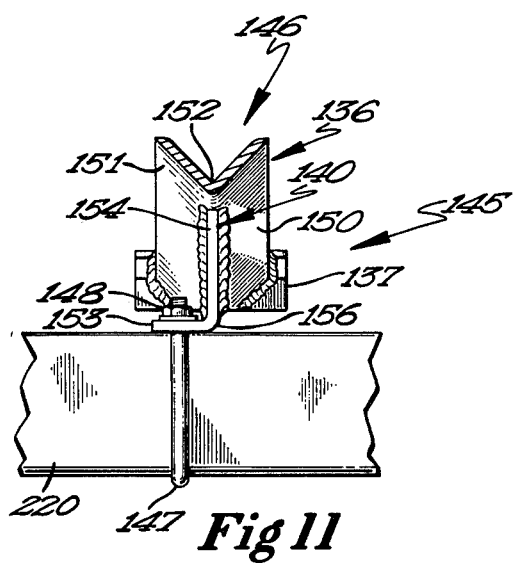
FIG. 11 shows a section mount taken through lines 11—11 of FIG. 3.
Figure 12:
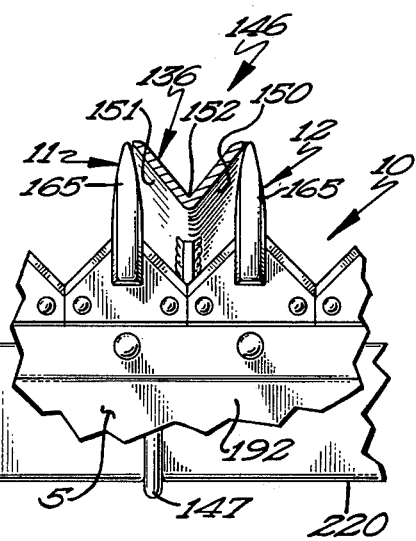
FIG. 12 shows a combine sickle guard being opposed by a section mount taken through lines 11—11 of FIG. 3.
Figure 13:
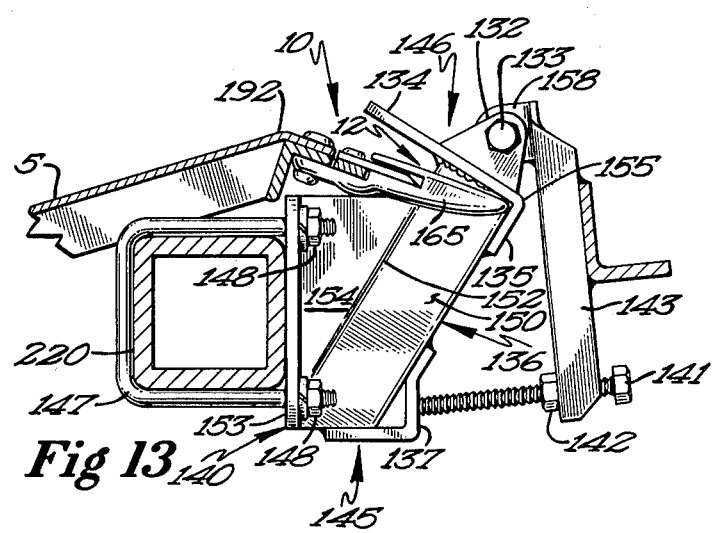
FIG. 13 is a side view of a combine sickle guard being opposed by a sickle guard guide.
Figure 15:
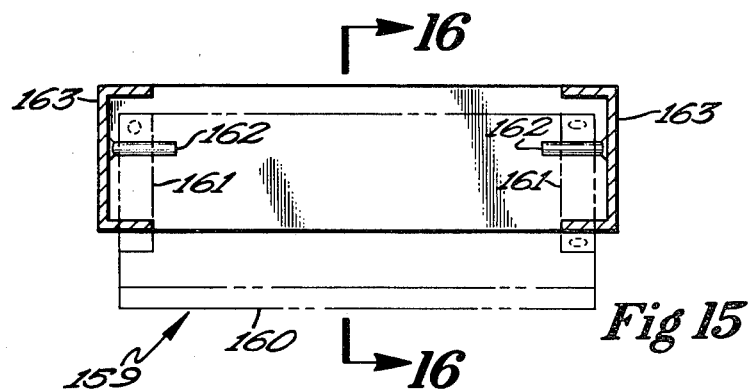
FIG. 15 is a cross sectional rear view of flap mounting brackets.

The drive, platform, and divider sections are attached to main frame 220 as illustrated in FIGS. 3 and 13. Mounting carriage 145 is attached to main frame tube 220 by U-bolt 147 and nuts 148. Mounting carriage 145 consists of sickle guard guide 146 which itself consists of a metal plate sent at 150 to form faces 134 and 135. FIG. 13 shows a side view of that plate. Sheer spacer 136 consists of two faces 150 and 151 formed by bending a plate at 152. FIG. 11 shows a view of sheer spacer 136 taken through line 11—11 of FIG. 3, where sickle guard guide 146 has been removed for the purposes of clarity. Also shown in FIG. 11 is plate 140 which has a rectangular face 153 which is attached to main frame 220 by U-bolt 147 and nuts 148. Plate 140 has opposite bend 156 face 154 which is triangular, the hypotenuse being welded to plate 136 at its bend 152. At the lower extremity of sheer spacer 136, support bracket 137 presents a flat face against which bolt 141 rests. Welded to plate 146 are two mounting brackets 132 which receive section 158 of the internal frame of the drive, platform, or divider section. Bolt 133 pivotally connects section 158 to mounting brackets 132. By adjusting nut 142 on bolt 141 the pitch of the internal frame of the drive, platform or divider section can be adjusted relative to the carriage mount 145.

Figures 16, 17:
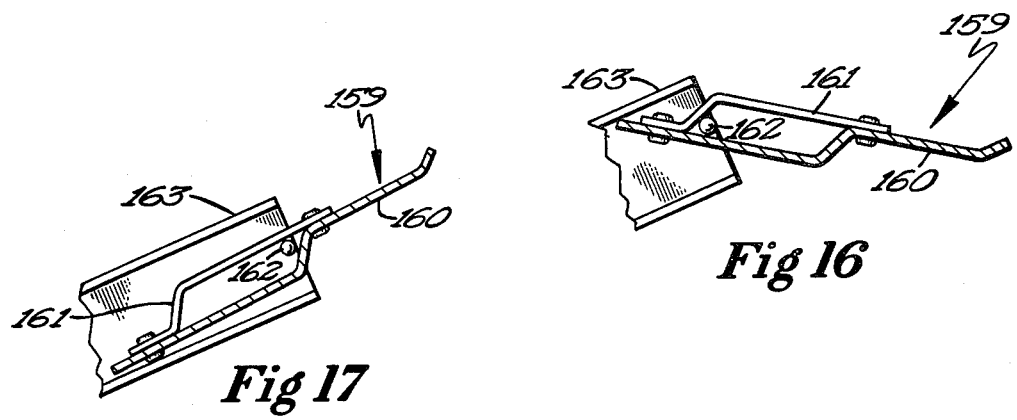
FIG. 16 is a cross sectional side view of a flap extending from its slot taken through lines 16—16 of FIG. 15.
FIG. 17 is a cross sectional side view of a flap inserted into its slot.

On the drive, divider, and platform sections, a retractable flap 159 is located above carriage mount 125. Retractable flap 159 consists of sheet 160 and rigid strap 161, both approximately as wide as the width of the section behind which it is located. However, transversely aligned and adjacent flaps are separated by a space somewhat greater than the width of the flightway and aligned with the flightway. In this manner, severed stalk crops can fall through the spacing between the flaps and into the combine trough. Strap 161 and sheet 160 are bent so as to form a parallelogram as shown in FIG. 16. The center of gravity of flap 159 lies approximately midway along the length of that parallelogram. By inserting flap 159 within complementary flap brackets 163 so that pins 162 reach within the parallelogram, the flap will have two relatively stable positions. As shown in FIG. 17, when flap 159 is pushed into the slot formed by flap brackets 163, the weight of flap 159 will cause it to rotate counterclockwise as shown in FIG. 17 until the extreme left end rests against the lower portion of flap brackets 163. On the other hand, should flap 159 be withdrawn from flap bracket 163, the weight of the bracket will cause the flap to rotate about pin 162 in a clockwise direction as shown in FIG. 16 until the extreme left end of the flap rests against the upper portion of flap brackets 163.

As shown in FIG. 13, when the harvesting attachment is mounted on a combine, combine guards 165 are opposed by angle 150 of sickle guard guides 146. FIG. 3 shows that when flap 159 is withdrawn from flap bracket 163, it extends rearward and downward. Thus, seeds and sunflower heads falling on the flap would, through the natural vibration of the harvesting attachment, fall down the flap and into the combine's cross auger trough. Thus, the presence of the flap reduces the chances of seeds and sunflowers falling on top of the sickle blades and falling between the various sections and the combine's cross auger trough. However, according to FIGS. 3 and 13 it would be difficult if not impossible to mount the harvesting attachment to an auger with the flap in a withdrawn position. This is so because the sickle guard must pass over main frame tube 220 but beneath the withdrawn flap. Thus, when mounting the harvesting attachment to a combine, the flap should be pushed into the flap bracket thereby moving the flap away from the path the sickle guard takes toward their final position at sickle guard guide 146. The natural vibration of the operating harvesting attachment will cause a flap to bounce around to the extent that eventually the flap will assume the withdrawn position shown in FIG. 16.

Figure 7:
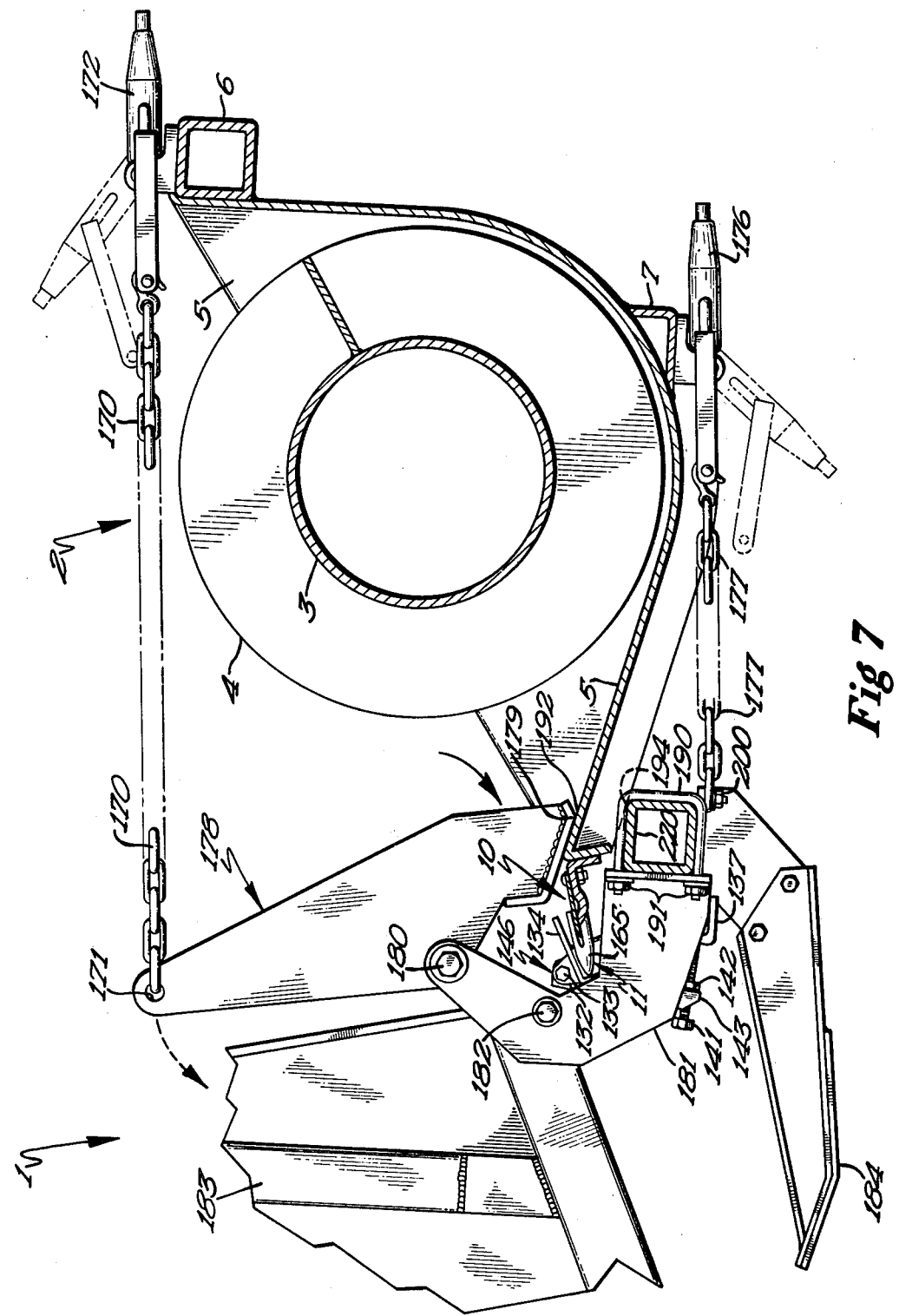
FIG. 7 is a side view of the harvesting attachment showing the structure used in mounting the harvesting attachment to a combine taken through lines 7—7 of FIG. 1.

With reference to FIG. 7, the harvesting attachment is mounted to the combine in the following manner. Mounting bracket 181 is rigidly attached to main frame 220 by U-bolts 190 and nuts 191. Mounting bracket 181 is pivotly attached to internal frame 183 of the divider section fender housing by bolt 182. Mounting bracket 181 is pivotally connected to locking cam by bolt 180. Because of the weight distribution of the divider, platform, and drive sections attached to main frame tube 220 and the U-shape of mounting bracket 181, if locking cam 178 were suspended the force of gravity would cause the sections to rotate downward toward the ground about bolt 180 and at some point in the rotation the sections form an acute angle relative to the ground in excess of the acute angle normally present when the harvesting attachment is mounted on a conventional combine.

Mounting bracket 181 is pivotally connected to locking cam 178 by bolt 180 at a point on locking cam 178 such that if the cam were pivotally supported at point 179 by front portion 192 of auger trough 5 and cam 178 were connected at hole 171 by chain 170 to upper portion 6 of the combine's cross auger trough, bolt 180 would lie longitudinally forward of a line containing bolt 171 and pivot point 179. Thus, cam 178 would be rotationally stable about pivot point 179, because the weight of frame 220 and sections attached thereto through the action of mounting bracket 181 would tend to cause counterclockwise rotation as seen in FIG. 7, while chain 170 being attached to hole 171 and trough portion 6 would resist such rotation.

Main frame tube 220 will extend under a combine's cross auger trough due to the U-shape of mounting bracket 181. Thus, as the force of gravity causes the longitudinally forward portion of the harvesting attachment to rotate about bolt 180 toward the ground main frame tube 220 will rotate under the combine's cross auger trough until it contacts the trough at point 194 and thereby prevents further rotation. By simple adjustment of the foregoing relationship and by adjusting the pitch of a section's internal frame vis-a-vis the carriage mount, a desired forwardly incline of the flightways and augers are possible. When mounted, the weight of the harvesting attachment is borne by the combine's cross auger trough through pivot point 179.

Horizontal movement of the harvesting attachment towards the combine's cross auger trough is prevented by the use of sickle guard guides 146 which oppose combine sickle guards 165 when the harvesting attachment is mounted onto the combine in the above described manner. Horizontal sheer of the harvesting attachment relative to the combine's cross auger trough is prevented by use of sheer spacer 136 which protrudes from sickle guard guide 146 in such a way that sheer spacer 136 wedges between such sickle guards 165.

The harvesting attachment may thus be mounted to a combine in the following manner. Prior to mounting, the harvesting attachment rests on stand 184. Without stand 184, the harvesting attachment would rest on the ground at main frame tube 220 causing the harvesting attachment to collapse onto the ground by virtue of divider sections rotating upward around bolt 182 and platform and drive sections rotating upward around bolts 133. By utilizing stand 184, which extends forward beyond the center of gravity of the harvesting attachment, the harvesting attachment remains in an upright position, the various sections being supported by bolt 141 resting against support bracket 137. With the harvesting attachment lying so close to the ground it is unlikely that the front of the combine's cross auger trough could be lowered sufficiently to match up with sickle guard guides 146.

With the harvesting attachment resting on stand 184, the front of the combine's cross auger trough is lowered to an extent which will allow the sickle guard to align themselves with guide 146. By rotating cam 178 in a counterclockwise direction as shown in FIG. 7, the combine may then be moved towards the harvesting attachment until sickle guards 164 align themselves with guides 146. At this point, chain 177, connected to main frame tube 220 by bolt 200 and connected to the lower cross auger trough frame 7 by over center lock 176, is adjusted in length so as to lock sickle guards 165 into alignment with guides 146. Cam 178 is rotated clockwise relative to FIG. 7 until pivot point 170 contacts the front portion 192 of the auger trough. The front of the auger trough is then raised to a height at which the crop stalks are to be severed. Chain 170 is adjusted in length so that by closing over center lock 172 the weight of the harvesting attachment will be borne by pivot point 179 and not by sickle guards 165 and in order to adjust the desired forward incline of the flightways as discussed earlier. When mounted in this manner, skid 201 of FIG. 3 rides slightly above the ground. Skid 201 functions to prevent damage to the undercarriage of the various section due to irregularities in the ground. Of course upon encountering such irregularities skid 201 causes the internal frame of the sections to rotate relative to the carriage mount around bolt 133 and to cause to a lesser degree rotation of the main frame around bolt 180.

As an alternative embodiment of the present invention, a harvesting attachment may consist of a single drive section of the type discussed above mounted on a main frame. Two divider sections of the types discussed above are aligned transversely with the drive section, the guide edge of one of the divider sections being immediately opposed to the transversely outward boundary of one of the drive section's augers and the guide edge of the other divider section being immediately opposed to the transversely outer boundary of the drive section's other auger. Of course the further alternatives discussed above for harvesting attachments having at least two drive sections apply to this alternative embodiment since the drive sections and divider sections of this alternative are identical to those discussed in connection with the harvesting apparatus having at least two drive sections.

It should be understood of course that the foregoing disclosure relates principally to a preferred embodiment of the invention and that numerous modifications or alterations may be made therein without departing from the spirit and scope of the invention as set forth in the appended claims.

I claim:

1. A crop harvesting attachment for use in combination with a combine having a cross auger trough and sickles and guards protruding forward of the trough, comprising:
    (1) means for presenting crops to said combines sickles;
    (2) frame means for supporting the weight of such crop presenting means; said crop presenting means attached to said frame means;
    (3) one or more mounting brackets, each comprising an upper section and a lower section, each mounting bracket rigidly attached to the frame means at the mounting bracket's lower section;
    (b 4) one or more locking cams, each comprising a lower pivot section and an upper section, each of said locking cams pivotally connected to a said mounting bracket at their respective upper sections; and
    (5) means for attaching each said locking cam's upper section to the upper rear portion of said combine's cross auger trough and for fixing the distance therebetween, said upper attaching means attached to the locking cam's upper section, said distance fixed so that the point, at which each said mounting bracket is pivotally connected to each said locking cam, is approximately above the locking cam's pivot section, but slightly longitudinally forward of a vertical line running through the locking cam's lower pivot section, when said lower pivot section is in contact with and being supported by the upper front portion of said cross auger trough.

2. The crop harvesting attachment of claim 1, wherein the upper section of each said mounting bracket is pivotally attached to said respective locking cam's upper section at a point which would be longitudinally forward of a line running through the locking cam's lower pivot section and the point at which the locking cam's upper section is attached to said upper attaching means when the locking cam's lower pivot section is in contact with the upper front portion of said combine's cross auger trough.

3. The crop harvesting attachment of claim 1, wherein the center of gravity of the harvesting attachment, excluding said one or more locking cams and said upper attaching means, is located so that it would be longitudinally forward of a vertical line running through the point at which the upper section of each said mounting bracket is connected to the respective upper section of each said locking cam when the locking cam's lower pivot section is in contact with and being supproted by the upper front portion of said combine's cross auger trough.

4. The crop harvesting attachment of claim 3, wherein a portion of the frame means extends longitudinally rearward so that it would contact the lower front portion of said combine's cross auger trough when the locking cam's lower pivot section is in contact with and being supported by the upper front portion of said combine's cross auger trough.

5. The crop harvesting attachment of claim 3, wherein said harvesting attachment further comprises means for attaching the longitudinally rearwardly extending portion of the frame means to the lower rear portion of said combine's cross auger trough and for fixing the distance therebetween, said distance fixed so that said longitudinally rearwardly extending portion of the frame would contact the lower front portion of said combine's cross auger trough when the locking cam's lower pivot section is in contact with and being supported by the upper front portion of said combine's cross auger trough.

6. The crop harvesting attachment of claim 1, wherein said harvesting attachment further comprises one or more sickle guard guide means for opposing a combine's sickle guards when the harvesting attachment is mounted onto the combine as described in claim 1, said sickle guard guide means connected to said frame means.

7. The crop harvesting attachment of claim 6, wherein wherein said harvesting attachment further comprises one or more sheer spacer means for wedging between sickel guards opposed by said sickle guard guide means, said sheer spacing means protruding longitudinally rearward from said sickle guard guide means.

* * * * *